March 13, 1962  A. F. FAIRBANKS  3,025,515
TWO-BAND SCANNING SYSTEM
Filed Aug. 2, 1954  2 Sheets-Sheet 2

INVENTOR.
AVARD F. FAIRBANKS
BY
William R. Lane
ATTORNEY

United States Patent Office 3,025,515
Patented Mar. 13, 1962

3,025,515
TWO-BAND SCANNING SYSTEM
Avard F. Fairbanks, South San Gabriel, Calif., assignor to North American Aviation, Inc.
Filed Aug. 2, 1954, Ser. No. 447,003
10 Claims. (Cl. 343—6)

This invention is a system capable of receiving infrared and microwave radiation alternatively or simultaneously and it particularly relates to a lightweight search and track scanning device employing infrared in conjunction with radar.

Information obtained by means of radar has several disadvantages. Among undesirable effects are those known as clutter, scintillation, and angular jitter. If a small, compact antenna reflector is used, accurate angular indication of particular targets and fine target discrimination cannot be obtained. Whereas a conventional radar beamwidth is three degrees, it is entirely possible that an infrared beamwidth of one tenth of one degree could be attained. An infrared system is desirable because it does not have the disadvantages of radar. In addition, an infrared system is passive, that is, it does not transmit signals; and, further, it is difficult to jam. Infrared and radar systems may be used cooperatively to obtain range information which cannot be obtained solely from a passive infrared system employing a single receiver.

A scanning device should provide ready change-over from search of a large area to a small sector. Search of a small sector is useful in devices which are servo controlled to provide automatic tracking. If the moving elements of the scanner are kept to a minimum, less dynamic balancing is required. It appears advantageous to have a scanner in which two dimensional scan of small areas can be obtained without any motion of the sensitive elements of the scanner.

It is therefore an object of this invention to provide a scanning device which can transmit and receive radar information and can receive infrared radiation.

It is another object of this invention to provide a scanning system for both infrared and microwave radiation.

A further object of this invention is to provide a compact, radiation detecting system controllable to search large areas or small sectors.

A still further object of this invention is to provide a scanner having two dimensional scan without detector motion.

Other objects of invention will become apparent from the following description taken in connection with the accompanying drawings, in which FIG. 1 is a perspective view of the scanner combined with a schematic of the system;

Figure 1:
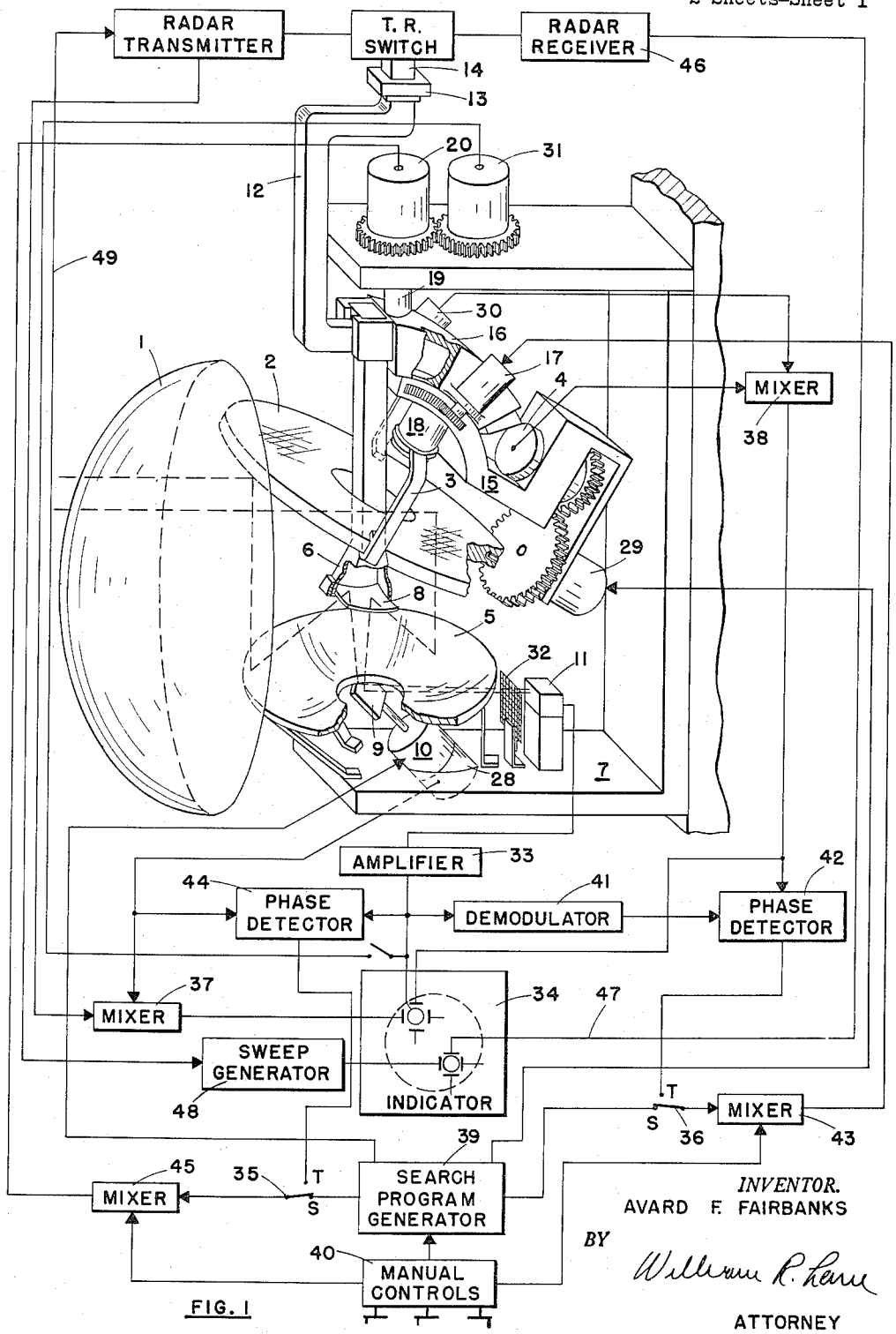

The scanning device is shown in FIG. 1. A mutual window 1 is constructed of a material which suitably passes both microwave and infrared radiation. This material may be either clear fused quartz or one of the infrared transparent glasses which are not characterized by high loss in the microwave region. This mutual window may be mounted to follow the primary motions of the scanner, or it may be a dome cover, mounted so as to have no motion. A plane mirror 2 is mounted to be oscillated up and down in yoke 3 by motor 29. Both microwave and infrared radiation is reflected by plane mirror 2 to paraboloidal mirror 5 which causes the rays to converge rapidly into radar horn 6. A concave spherical mirror would roughly provide the desired convergence of rays. These mirrors are constructed of a material such as glass that may be ground and polished and have its surface coated with aluminum or other highly conducting and reflecting metal. The paraboloidal mirror is mounted on a bracket 7, illustrated as fixed.

Radar horn 6 is partially broken away to show a third mirror 8 which is constructed of a dielectric such as fused quartz or polystyrene, which has low loss at microwave frequencies, and readily passes microwave radiation into the horn. An infrared reflecting surface on the lower surface of mirror 8 is obtained, for example, by evaporating thereon a number of parallel bars of aluminum or other metal highly reflecting in the infrared region, arranged perpendicular to the E vector of the radar transmission. Thus arranged, the bars do not prevent microwaves from entering or issuing from horn 6. Mirror 8 may be prepared by using a grid as a mask so that a number of small unconnected rectangles are evaporated upon the lower surface as an alternative to the parallel bars. Mirror 8 is, therefore, a radar window. Mirror 8 is hyperboloidal in shape and causes the infrared waves to converge less rapidly upon mirror 9 which is oscillated rapidly by rotary vibrator 10, constrained in a manner to prevent rotation but to cause oscillation. The infrared rays focus upon infrared sensitive cell 11 which is mounted on bracket 7. Suitable detecting cells are chosen according to their spectral sensitivity, speed of response, characteristics; and they include the lead sulphide cells, bolometer, photo transistor and the blue or near infrared photoelectric cells. The amplitude of oscillation of vibrator 10 is dependent on the size of infrared sensitive cell 11 and the amount of the oscillating sweep in azimuth desired. The amplitude of motion of vibrator 10 is such as to provide a scanning action back and forth across mirror 2 for infrared sensitive cell 11.

Microwave radiation continues from horn 6 up through waveguide 12, rotating joint 13, and waveguide section 14 which leads to the radar receiver and transmitter. Mirror 2 provides small angle sweep or scan in an elevation. Scanning of larger angles of elevation are obtained by motor 17 driving slotted slide 15 in guide bed 16. Attached to slide 15 is a shank 18 which holds aforementioned yoke 3.

In order to provide scan in azimuth, guide bed 16 is attached to bracket 7 by shaft 19 driven by motor 20. When larger sweep in azimuth is desired motor 20 rotates guide bed 16 which carries with it radar waveguide and plane mirror 2.

It will be noted in summary that two minor scanning actions are obtained. The first in elevation, by oscillation of mirror 2, the second in azimuth, by oscillation of mirror 9. These two actions are termed "scanning." In order to obtain search of larger sectors, greater drive in elevation is obtained by motor 17 driving slide 15 and greater drive in azimuth by motor 20 rotating guide bed 16. Thus, in the search stage, motors 20 and 17 are used to move the center 33, FIG. 2, of the search scan and when the device is changed to tracking the target, these motors are used as servos, controlled by the output of the infrared cell in a manner similar to radar tracking modes. It is a salient feature that both the radar horn and the infrared sensitive cell are motionless during scanning by mirrors 2 and 9. It is also noted that increased elevation does not move either the infrared detector or the radar horn.

Figure 2:
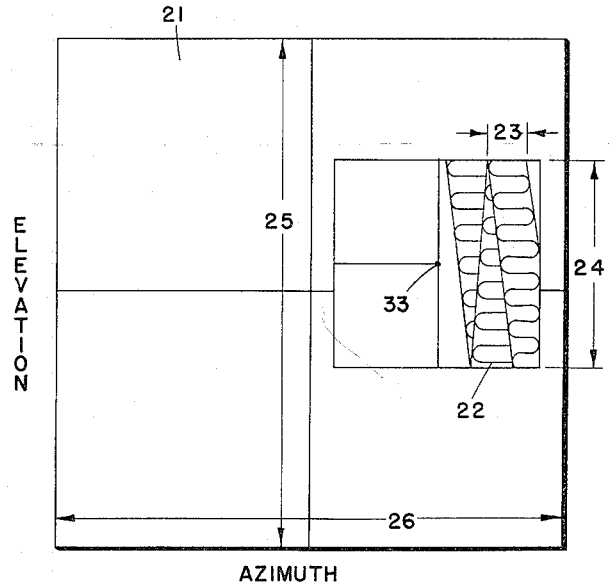
FIG. 2 is an illustration of area scan.

FIG. 2 is an indicator representation of the scanner information. Assuming an area 21 in which it is possible to scan, wavy lines 22 lying in superimposed tracks indicate the infrared sweep of the area. The width of each track as represented by width 23 is determined by the amplitude of oscillation of mirror 9. The length of each track indicated by length 24 is determined by the amplitude of oscillation of mirror 2. The total elevation to which the device can scan, indicated by length 25, is determined by the distance slide rod 15 can be driven; and the length 26, which is the sweep in azimuth, is determined by the amount of rotation that can be imparted to shaft 19 before limit stops are reached.

Figure 3:
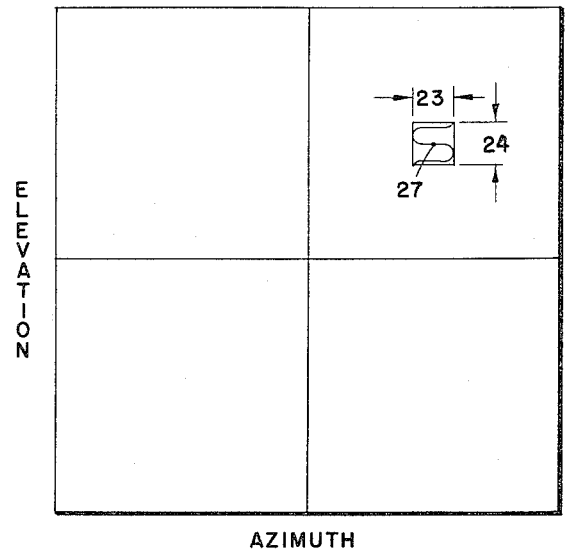
FIG. 3 is an illustration of sector scan.

Assuming the device is in a system in which original searching occurs and, later, tracking or pinpointing, occurs, it may be desirable to then feed motor 29 with a smaller amplitude signal in order that it does not rotate completely but oscillates much the same as motor 10 and thus limits the oscillation of plane mirror 2 which provides the small sweep indicated in FIG. 3. Sweep width 23 being obtained by mirror 9 and sweep height 24 being obtained by mirror 2, a target is indicated at 27 which would appear as an intensified beam trace.

To display the output of infrared sensitive cell 11 requires signal voltages be obtained representing the motion of each of the driving and scanning elements of the scanner. These are obtained by pick-offs adapted to be rotated by the motor in each instance.

The scheme of presentation of the infrared output is similar to conventional radar C scope, or elevation and azimuth presentation. In FIG. 1, the output of the infrared sensitive cell 11 is amplified and presented to the intensity grid of indicator 34 by amplifier 33. During the search phase, switches 35 and 36 are turned to "S." The signal voltages which locate the infrared cell signal in its proper place horizontally on the indicator 34 are received from the azimuth pick-offs 31 and 28, combined in mixer 37, and fed to the horizontal deflection plates of the indicator 34. The signal voltages which locate the infrared cell signal in its proper place vertically on the indicator 34 are received from elevation pick-offs 4 and 30, combined in mixer 38, and fed to the vertical deflection plates of indicator 34.

Search program generator 39 provides output voltages to drive the scan motors 10 and 29 in accordance with the setting of manual control 40. Program generator 40 also provides output voltages to drive azimuth motor 20 and elevation motor 17 during search.

Upon turning the system to "track," two servo loops are completed to drive the scanner in accordance with the targets detected by the infrared cell. Switches 35 and 36 are thrown to "T." Demodulator 41 provides detector 42 with the signal from infrared cell 11. Phase detector 42 provides an output depending on the phase of the received signal and the signal from pick-offs 4 and 30. By mixer 43, the output of the phase detector 42 is combined with any manual control azimuth signal and a closed servo loop is completed to drive motor 17; and the antenna thus follows the target in elevation. Phase detector 44 provides an output depending on the phase of the received signal and the pick-off 28. Mixer 45 combines these signals with any desired manual control signal in azimuth and a closed servo loop is completed to drive motor 20; and the antenna thus follows the target in azimuth. Manual control 40 need only provide mixers 43 and 45 with D.C. voltages generated according to handset controls.

The range presentation of the radar receiver 46 is received at the indicator through line 47 and is presented, for example, by a second electron gun within indicator 34. The deflection plates of the second gun are impressed with a sweep voltage obtained in conventional manner from sweep generator 48 which is controlled by the transmitter. In order to remove considerable radar return, the radar transmitter can be operated to transmit only when an infrared signal is being received. Line 49 indicates that the transmitter 50 may be triggered by the infrared signal so that ranges will be received only with the infrared radiation.

During periods of transmission by the radar, microwave radiation emerging from horn 6 strikes paraboloidal mirror 5, is reflected to mirror 2 and passes out through mutual window 1. A small screen 32 may be placed in front of cell 11 to reflect the microwave radiation. The mutual window may be fixed with respect to guide bed 16 or slide 15 in order to act as an eyeball and partake of the primary motion of this scanner in elevation and azimuth.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a microwave and infrared radiation scanning system, a scanner comprising a mirror constructed and disposed to receive and focus both said types of radiation, means adapted to pass microwave radiation and reflect infrared radiation brought into focus by said mirror, a radar antenna disposed to receive the microwave radiation, radar ranging means connected to said antenna, an infrared sensitive device disposed to receive the infrared radiation, indicator means connected to display the output of said infrared sensitive device, means for driving said scanner, means for synchronizing the sweep of said indicator means with the motion of said scanner, and means for displaying the output range information of said radar means.

2. In a microwave and infrared radiation scanning device, a mirror constructed and disposed to receive and focus both said types of radiation, means adapted to pass microwave radiation and reflect infrared radiation brought into focus by said mirror, a radar antenna disposed to receive the microwave radiation passed by said means, and an infrared sensitive device adapted to receive the infrared radiation reflected by said radar window.

3. In a microwave and infrared radiation scanning device, a first mirror disposed to receive and reflect said radiation, a paraboloidal mirror disposed to receive and reflect the radiation reflected by said first mirror, a radar window disposed to receive and pass microwave radiation from said paraboloidal mirror and receive and reflect the infrared radiation from said paraboloidal mirror, a radar antenna disposed to receive the microwave radiation passed by said radar window and an infrared sensitive cell adapted to receive the radiation reflected by said radar window.

4. In a scanning device for microwave and infrared radiation, a first mirror, a paraboloidal mirror disposed to receive the reflections of said first mirror, a radar window disposed to receive the reflections of said paraboloidal mirror, said radar window being constructed to reflect the infrared radiation received from said paraboloidal mirror and pass the microwave radiation, a third mirror disposed to receive the infrared radiation reflected by said radar window, an infrared sensitive device disposed to receive the reflections of said third mirror, and a radar receiving antenna disposed to receive the microwave radiation passed by said radar window.

5. The combination recited in claim 4 wherein said first and third mirrors are drivably mounted plane mirrors.

6. The combination recited in claim 4 wherein said radar window is hyperboloidal in shape.

7. In a scanning device for microwave and infrared radiation, a first plane mirror oscillatably mounted, a paraboloidal mirror disposed to receive and redirect the reflections of said first plane mirror to a position intermediate the length of said first plane mirror, a radar horn disposed intermediate the length of said first plane mirror and directed to receive the reflections from said paraboloidal mirror, a radar window of hyperboloidal configuration disposed between said paraboloidal mirror and said radar, said radar window being adapted to pass microwave radiation to said radar horn and reflect the infrared radiation received from said paraboloidal mirror to a central location in said paraboloidal mirror, and an infrared sensitive device disposed centrally of said paraboloidal mirror to receive the reflections of said hyperboloidal radar window.

8. In a scanning device for microwave and infrared radiation, a first plane mirror oscillably mounted and having a central opening therethrough, a paraboloidal mirror having a central opening therethrough and disposed to receive and redirect the reflections of said plane mirror to said central opening of said first plane mirror, a radar horn extending to a position near the central opening of said first plane mirror to receive the reflections from said paraboloidal mirror, a hyperboloidal radar window disposed between said radar horn and said paraboloidal mirror, said radar window being adapted to pass the microwave radiation into said horn and reflect the infrared radiation received from said paraboloidal mirror to the central opening through said paraboloidal mirror, a second plane mirror drivably mounted and disposed to receive the infrared reflections from said hyperboloidal radar window, and an infrared sensitive device disposed to receive the reflections of said second plane mirror.

9. In a microwave and infrared radiation scanning device wherein is provided structural mounting means, the combination of a first mirror which reflects microwave and infrared radiation and is drivably mounted with respect to said mounting means, means for oscillating said first mirror at its driven position, a paraboloidal mirror mounted on said mounting means so as to receive and reflect radiation reflected by said first mirror, a radar antenna adapted to be driven in azimuth with said first mirror and disposed to receive the reflections of said paraboloidal mirror, a hyperboloidal mirror disposed between said radar antenna and said paraboloidal mirror, said hyperboloidal mirror adapted to pass microwave radiation between said radar antenna and said paraboloidal mirror and reflect infrared radiation, and an infrared sensitive cell disposed to receive the infrared radiation reflected by said hyperboloidal mirror.

10. The combination recited in claim 9 wherein said first mirror is drivably mounted in elevation and azimuth with respect to said mounting means.

References Cited in the file of this patent

UNITED STATES PATENTS

| | | |
|---|---|---|
| 2,842,760 | McLucas | July 8, 1958 |
| 2,895,127 | Padgett | July 14, 1959 |